(12) United States Patent
Ibaraki et al.

(10) Patent No.: US 7,230,191 B2
(45) Date of Patent: Jun. 12, 2007

(54) HINGE APPARATUS HAVING A SWITCH AND ELECTRONIC APPARATUS INCLUDING THE HINGE APPARATUS

(75) Inventors: Kazuaki Ibaraki, Tokyo (JP); Masao Higuchi, Tokyo (JP)

(73) Assignee: Japan Aviation Electronics Industry, Limited, Tokyo (JP)

( * ) Notice: Subject to any disclaimer, the term of this patent is extended or adjusted under 35 U.S.C. 154(b) by 216 days.

(21) Appl. No.: 10/986,544

(22) Filed: Nov. 10, 2004

(65) Prior Publication Data

US 2005/0097707 A1 May 12, 2005

(30) Foreign Application Priority Data

Nov. 12, 2003 (JP) ............................. 2003-383053

(51) Int. Cl.
*H01H 19/00* (2006.01)
*H01H 19/11* (2006.01)
*H01H 19/58* (2006.01)

(52) U.S. Cl. .................................. 200/11 R; 200/61.7
(58) Field of Classification Search ............... 200/11 R
See application file for complete search history.

(56) References Cited

U.S. PATENT DOCUMENTS 6,194,673 B1* 2/2001 Sato et al. ..................... 200/4
6,373,006 B1* 4/2002 Toki ........................... 200/61.7
6,642,462 B2* 11/2003 Ninomiya et al. .......... 200/61.7
2005/0006212 A1* 1/2005 Han et al. ................... 200/61.7

FOREIGN PATENT DOCUMENTS

| JP | 2002-279856 | 9/2002 |
| JP | 2002-279857 | 9/2002 |
| JP | 2002-320014 A | 10/2002 |

* cited by examiner

*Primary Examiner*—Elvin Enad
*Assistant Examiner*—Lheiren Mae A. Anglo
(74) *Attorney, Agent, or Firm*—Frishauf, Holtz, Goodman & Chick, P.C.

(57) ABSTRACT

In a hinge apparatus for rotatably connecting a first housing and a second housing of an electronic apparatus, the hinge apparatus includes a first rotating portion adapted to be connected to the first housing and a second rotating portion adapted to be connected to the second housing and rotatable with respect to the first rotating portion. The second rotating portion unrotatably holds a switch. A cam member is disposed to face the switch. The cam member is rotatable with respect to the second rotating portion and adapted to be engaged with the second housing in a rotating direction of the hinge apparatus. The switch includes a conductive first contact and a conductive second contact faced to the first contact and adapted to be connected to and disconnected from the first contact. The cam member has a cam portion for pressing the second contact following the rotation of the cam member to connect and disconnect the second contact to and from the first contact.

11 Claims, 13 Drawing Sheets

HINGE APPARATUS HAVING A SWITCH AND ELECTRONIC APPARATUS INCLUDING THE HINGE APPARATUS

This application claims priority to prior Japanese patent application JP 2003-383053, the disclosure of which is incorporated herein by reference.

BACKGROUND OF THE INVENTION

This invention relates to a hinge apparatus for use in an electronic apparatus, such as a mobile telephone, a personal digital assistant (PDA), and a notebook-type personal computer.

For example, a mobile telephone generally comprises an operating part and a display part. The operating part is provided with an operating portion. The display part is provided with a display surface. Recently, the operating part and the display part are often connected by a hinge apparatus to be foldable, i.e., openable and closable. Such a mobile telephone will hereunder be call a foldable mobile telephone.

With the foldable mobile telephone, the display part may be opened only when it is desired and required. Thus, it is possible to protect the operating portion and the display surface and to prevent an operation error. Further, the mobile telephone in a closed state is reduced in size and is therefore convenient for a user to carry. In addition, the operating portion and the display surface can easily be increased in size.

A mobile terminal of the type is disclosed, for example, in Japanese Patent Application Publication (JP-A) No. 2002-320014. The mobile terminal comprises a pair of housings connected to each other to be openable and closable around a rotating portion, and a switch for detecting an opened state and a closed state of the housings. The switch is disposed inside one of the housings. Thus, the opened state and the closed state of the housings are detected by the switch. It is therefore possible to design the mobile terminal so that a power supply to the mobile terminal is automatically turned on and off when the housings are opened and closed, respectively.

However, the switch is disposed inside the one housing so that the mobile terminal is inevitably increased in size and complicated in structure.

SUMMARY OF THE INVENTION

It is therefore an object of the present invention to provide a hinge apparatus having a switch and adapted to realize an electronic apparatus compact in size and simple in structure.

It is another object of the present invention to provide an electronic apparatus including the hinge apparatus of the type described.

Other object of the present invention will become clear as the description proceeds.

According to an aspect of the present invention, there is provided a hinge apparatus for connecting a first housing and a second housing of an electronic apparatus so that the first and the second housings are rotatable with respect to each other, the hinge apparatus comprising a first rotating portion adapted to be connected to the first housing, a second rotating portion adapted to be connected to the second housing and rotatable with respect to the first rotating portion, a switch unrotatably held by the second rotating portion, and a cam member disposed to face the switch, the cam member being rotatable with respect to the second rotating portion and adapted to be engaged with the second housing in a rotating direction of the hinge apparatus, the switch including a conductive first contact and a conductive second contact faced to the first contact and adapted to be connected to and disconnected from the first contact; the cam member having a cam portion for pressing the second contact following the rotation of the cam member to connect and disconnect the second contact to and from the first contact.

According to another aspect of the present invention, there is provided an electronic apparatus comprising a first housing, a second housing, and the hinge apparatus described in the above, the hinge apparatus connecting the first and the second housing so that the first and the second housings are rotatable with respect to each other.

BRIEF DESCRIPTION OF THE DRAWINGS

FIG. 17 is a side view showing an ON state where a switch illustrated in FIG. 14 turns on.

DESCRIPTION OF THE PREFERRED EMBODIMENTS

At first referring to FIGS. 1 through 3, description will be made of a camera-equipped electronic apparatus having a hinge apparatus according to a first embodiment of the present invention.

The electronic apparatus illustrated in the figure comprises a first housing 1 having large-sized case members 1a and 1b, a second housing 2 having small-sized case members 2a and 2b, a camera 3 held by the second housing 2, a hinge apparatus 4 interposed between the first and the second housings 1 and 2, and a flexible board (FPC) 5. The hinge apparatus 4 has a cylindrical structure splittable into two sections in a radial direction and comprises first and second rotating portions 6 and 7 arranged adjacent to each other on a same axis. The first rotating portion 6 is connected to the flexible board 5. The second rotating portion 7 is rotatable with respect to the first rotating portion 6 and is fixed to the camera 3.

The first housing 1 is connected to the hinge apparatus 4 so as to encase the first rotating portion 6. The first rotating portion 6 is engaged with the first housing 1 in a rotating direction so as to be unrotatable. The flexible board 5 is fixedly disposed inside the first housing 1 and has a part rolled and received in the first rotating portion 6. The second housing 2 is connected to the hinge apparatus 4 so as to encase the second rotating portion 7 and encloses the camera 3 to protect the camera 3. Thus, the first and the second housings 1 and 2 are connected to each other to be rotatable with respect to each other.

Referring to FIGS. 4A to 4C and 5A to 5C in addition, the hinge apparatus 4 will be described in detail.

The hinge apparatus 4 further has a switch 8 and a switch ring or cam member 9 for driving the switch 8. The second rotating portion 7 has a cylindrical portion 10 formed at one end in an axial direction. The cylindrical portion 10 has a receiving portion 10a as a recess having a rectangular section, a cylindrical outer peripheral surface 10b, and a cut portion 10c extending from the outer peripheral surface 10b to the receiving portion 10a. At a part of the receiving portion 10a, two conductor portions 5a are exposed as a part of a circuit formed on the flexible board 5. With a structure which will later become clear, the switch 8 is received or inserted in the receiving portion 10a to be unrotatable and removable.

Referring to FIGS. 7 to 10, the switch 8 will be described.

The switch 8 has an insulating base 8a having a rectangular section equivalent to that of the receiving portion 10a, two narrow fixed contacts (first contacts) 8b held by the base 8a and having conductivity and elasticity, and a wide movable contact (second contact) 8c. The fixed contacts 8b are disposed in two grooves 8a1 formed on the base 8a, respectively. Each of the fixed contacts 8b is formed into a generally U shape and has a first contacting portion 8b1 located on one side of the base 8a and a second contacting portion 8b2 located on the other side of the base 8a. The movable contact 8c is formed into a generally L shape and has a movable contacting portion 8c1 faced to the first contacting portion 8b1 with a space left therebetween, and a protruding portion 8c2 as an operating portion. When the protruding portion 8c2 is pressed, the movable contacting portion 8c1 is brought into contact with the first contacting portions 8b1 of the two fixed contacts 8b to electrically connect the fixed contacts 8b through the movable contacting portion 8c1. In other words, the switch 8 is turned into an ON state. When pressing force upon the protruding portion 8c2 is released, the movable contacting portion 8c1 is separated from the first contacting portions 8b1 under elastic restoring force of the movable contact 8c so that the fixed contacts 8b are electrically isolated or separated from each other. In other words, the switch 8 is turned into an OFF state.

As mentioned above, the switch 8 is received in the receiving portion 10a formed in the hinge apparatus 4 and having the rectangular section. Then, the switch 8 is inhibited from rotation about a center axis of the hinge apparatus 4 because the base 8a is engaged with a side wall of the receiving portion 10a. In this state, the second contacting portions 8b2 are contacted with the conductor portions 5a. The protruding portion 8c2 protrudes from the outer peripheral surface 10b of the cylindrical portion 10 through the cut portion 10c. With this structure, the switch 8 is received in the hinge apparatus 4 and, therefore, the switch 8 need not be arranged at another position. Thus, the electronic apparatus can be designed to be compact in size.

Turning back to FIGS. 4A through 4C and 5A through 5C, the cam member 9 will be described.

The cam member 9 has a cylindrical shape with one end as a closed end and is fitted over the cylindrical portion 10 to be rotatable. As a result, the cam member 9 is faced to the switch 8 in the radial direction. The cam member 9 has an outer peripheral surface provided with an engaging portion 9a to be engaged with the first housing 1 in the rotating direction. The cam member 9 has an inner peripheral surface provided with a cylindrical surface 9b close to the outer peripheral surface 10b of the cylindrical portion 10, and a recess or an escape portion 9c partially depressed from the cylindrical surface 9b. The recess 9c is formed at a position faced to the cut portion 10c when the cam member 9 is rotated with respect to the cylindrical portion 10. As will be described in the following, the cylindrical surface 9b and the recess 9c serve as a cam portion for operating the switch 8 following relative rotation between the second rotating portion 7 and the cam member 9.

Referring to FIGS. 1 through 10, an operation of the hinge apparatus 4 will be described.

Figure 1:
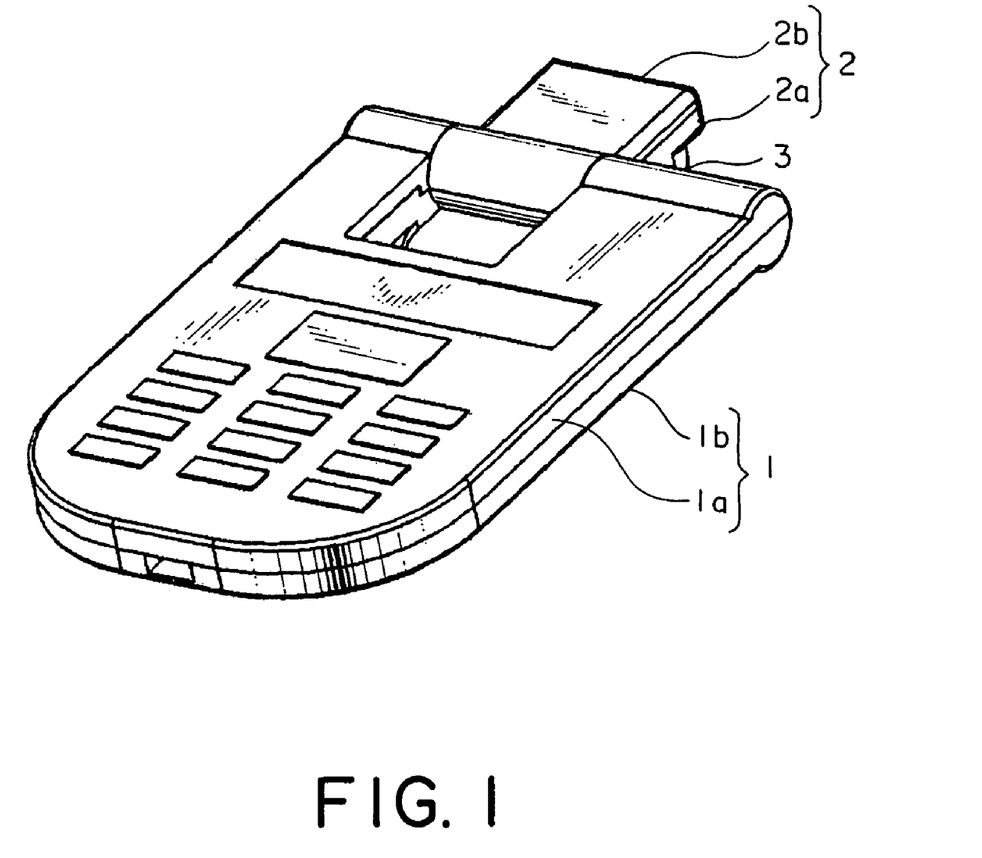
FIG. 1 is an exploded perspective view of a camera-equipped electronic apparatus having a hinge apparatus according to a first embodiment of the present invention.

Referring to FIG. 1, the electronic apparatus is in a normal state where the camera 3 protrudes from the first housing 1 contained in a main body of the electronic apparatus. In the normal state, a user or photographer can normally take a photograph of a front scene. It is assumed here that, in the normal state, the protruding portion 8c2 of the switch 8 is faced to the cylindrical surface 9b of the cam member 9. Therefore, the cylindrical surface 9b is engaged with the protruding portion 8c2 to push the protruding portion 8c2 inward so that the switch 8 is turned into an ON state.

Figure 2:
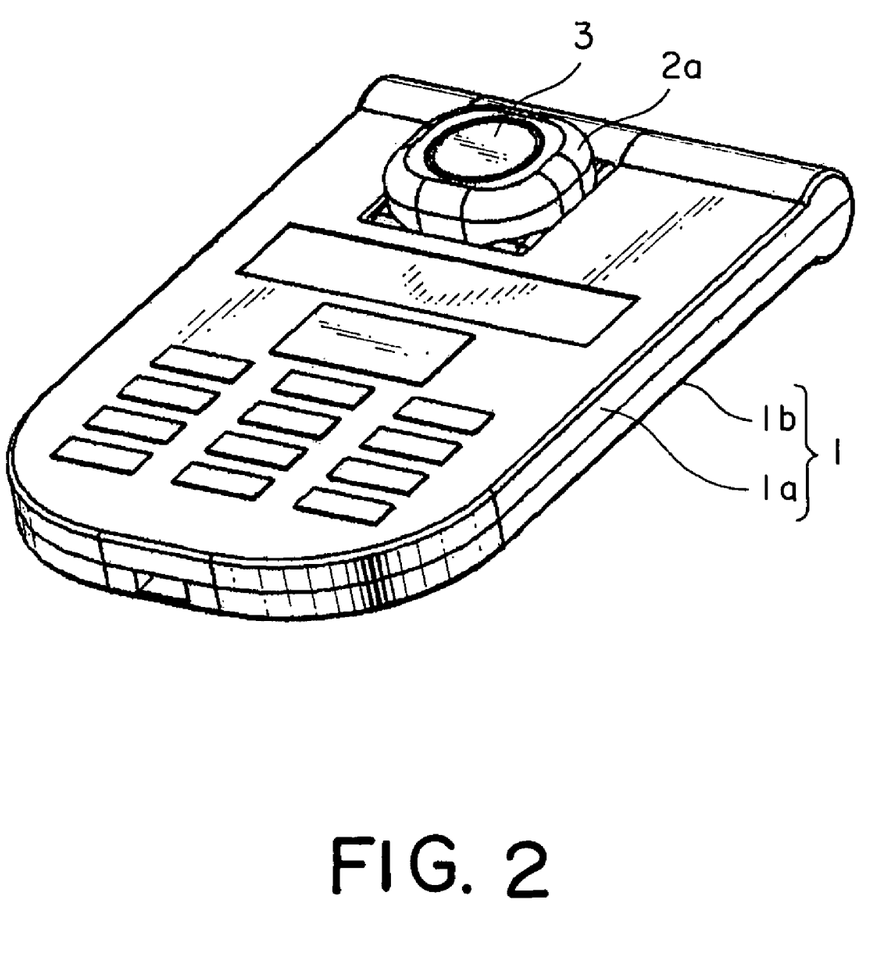
FIG. 2 is a perspective view of the electronic apparatus in FIG. 1 with a different camera position.
Figure 3:
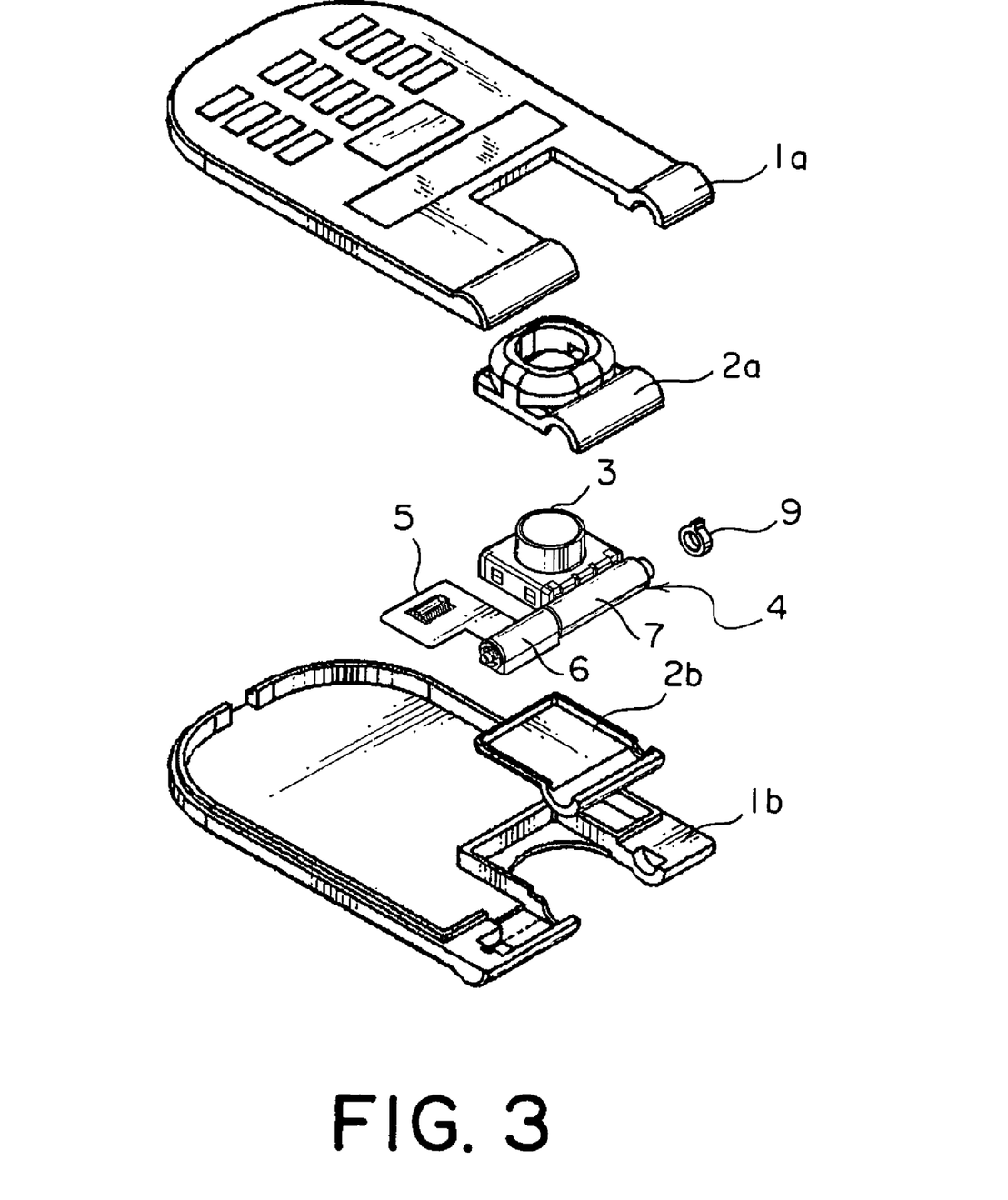
FIG. 3 is an exploded perspective view of the electronic apparatus in FIGS. 1 and 2.
Figure 4A:
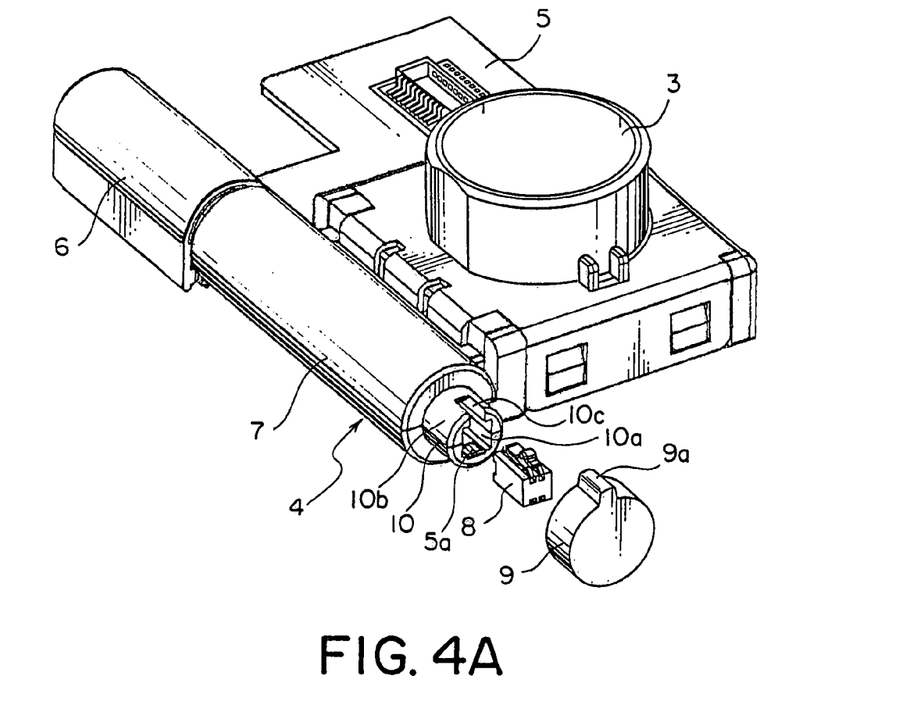
FIG. 4A is a perspective view of a characteristic part, including the hinge apparatus, of the electronic apparatus in FIGS. 1 through 3 in an exploded state.
Figure 4B:
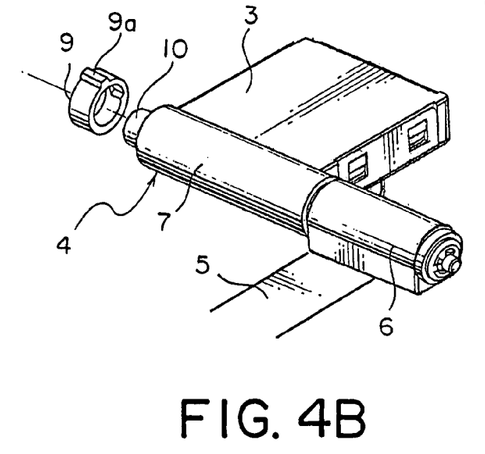
FIGS. 4B and 4C are perspective views of the characteristic part, including the hinge apparatus, of the electronic apparatus in FIGS. 1 through 3 during assembling.
Figure 4C:
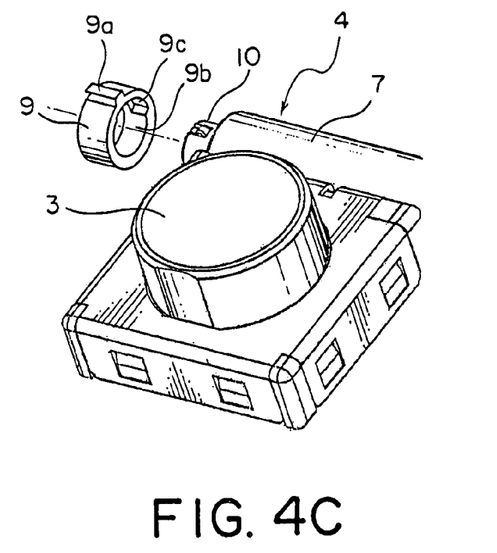
Figure 5A:
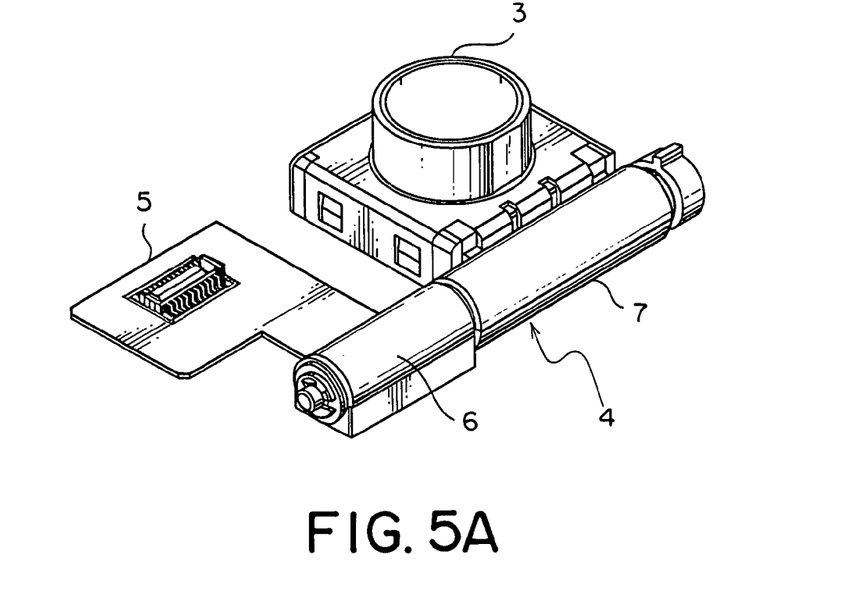
FIGS. 5A through 5C are perspective views of the characteristic part, including the hinge apparatus, of the electronic apparatus in FIGS. 1 through 3 in an assembled state.
Figure 5B:
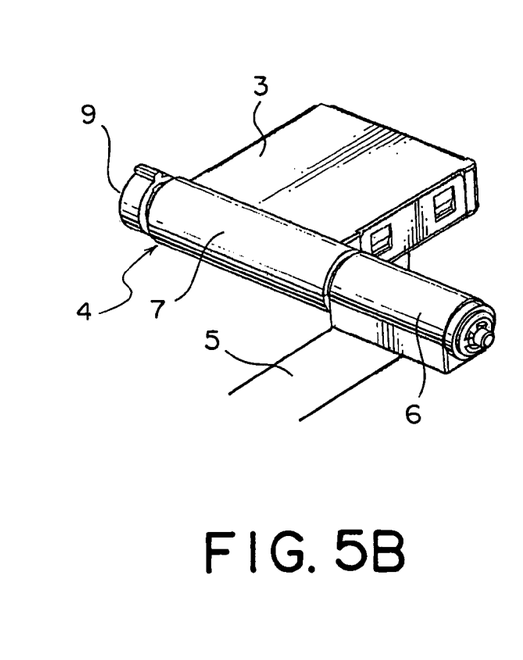
Figure 5C:
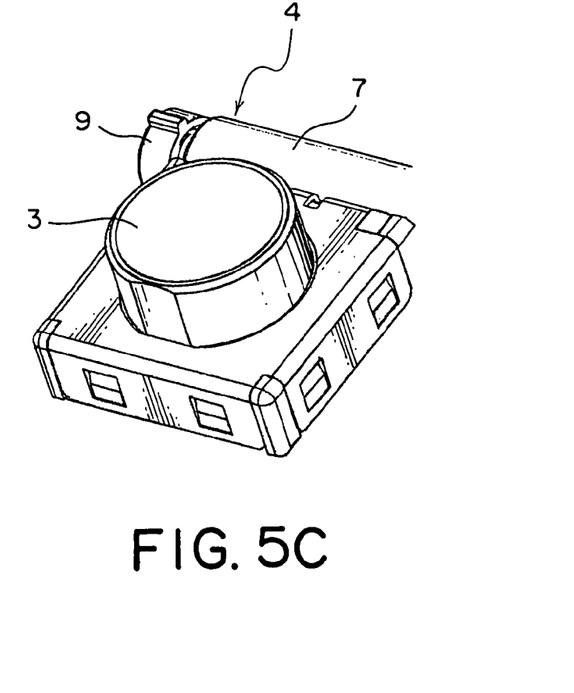
Figure 6:
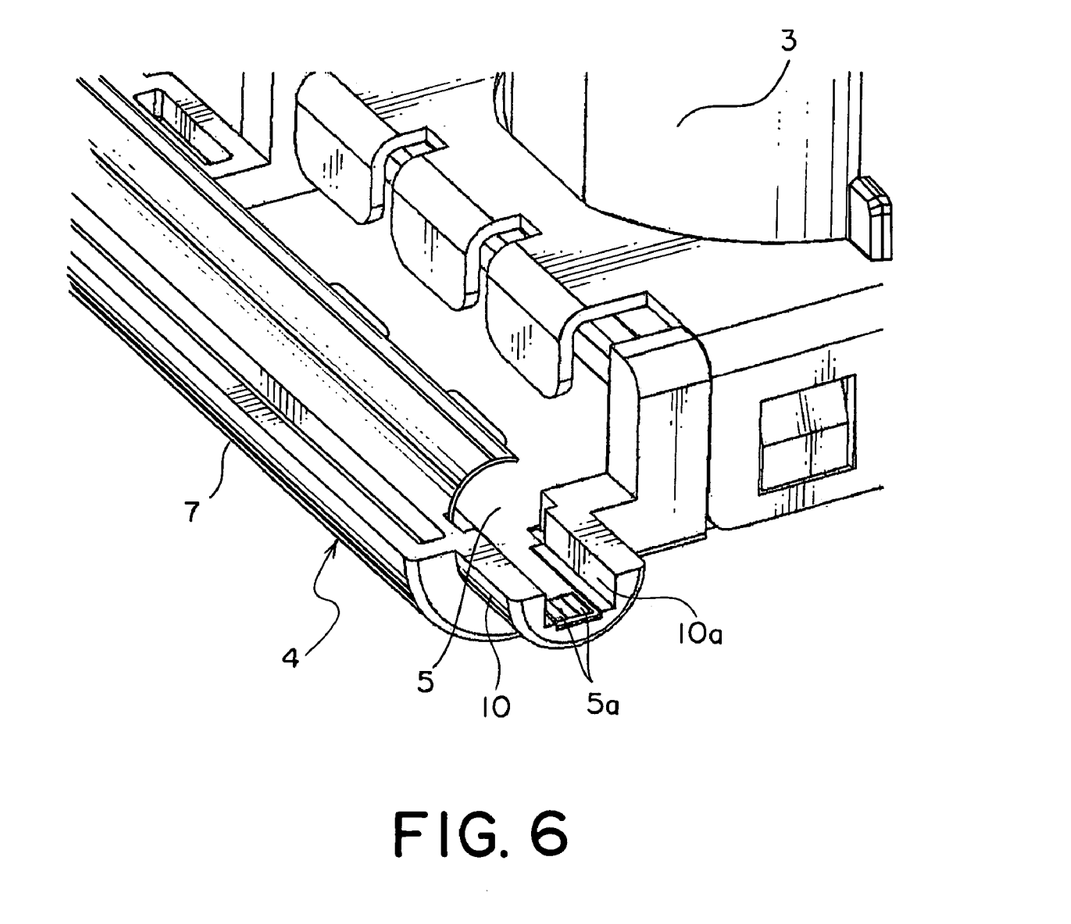
FIG. 6 is a perspective view showing an internal structure of the hinge apparatus by removing some of components thereof.
Figure 7:
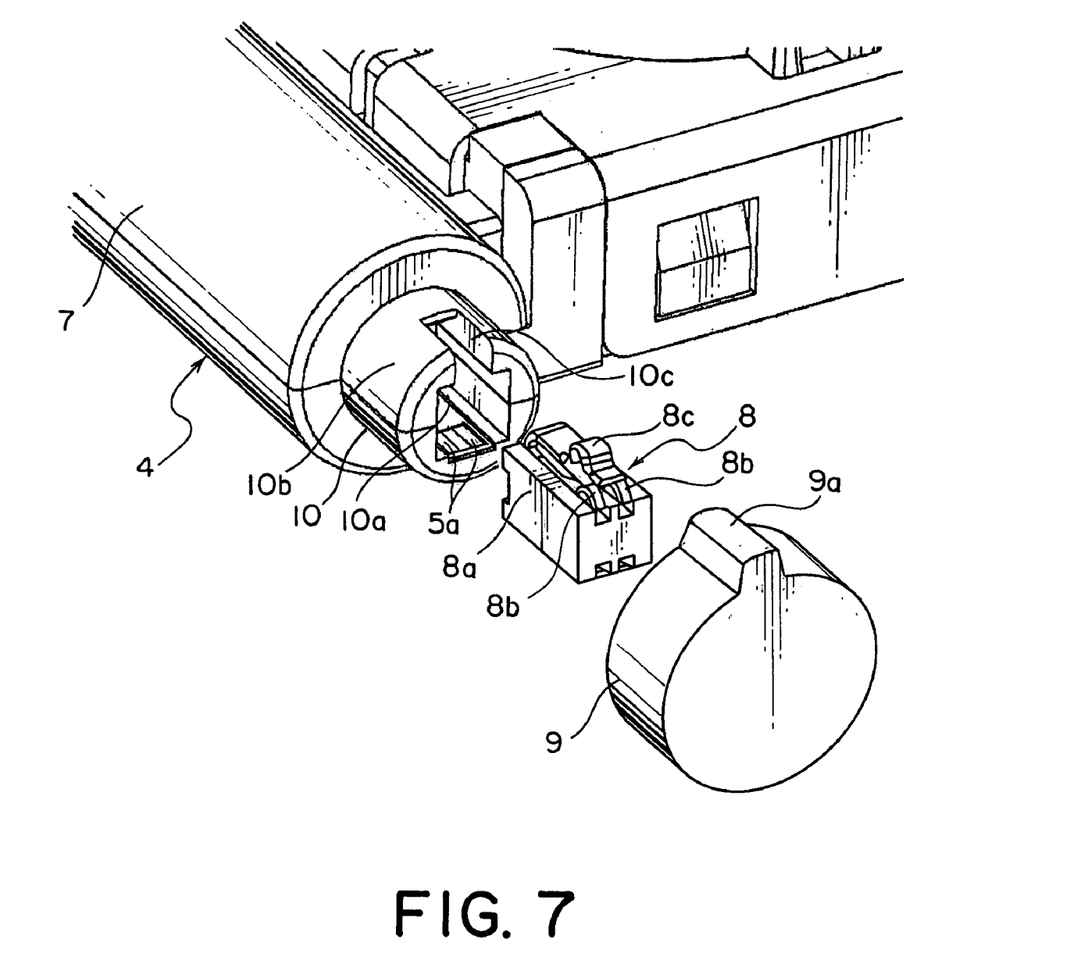
FIG. 7 is an enlarged view of a part in FIG. 4A.
Figure 8:
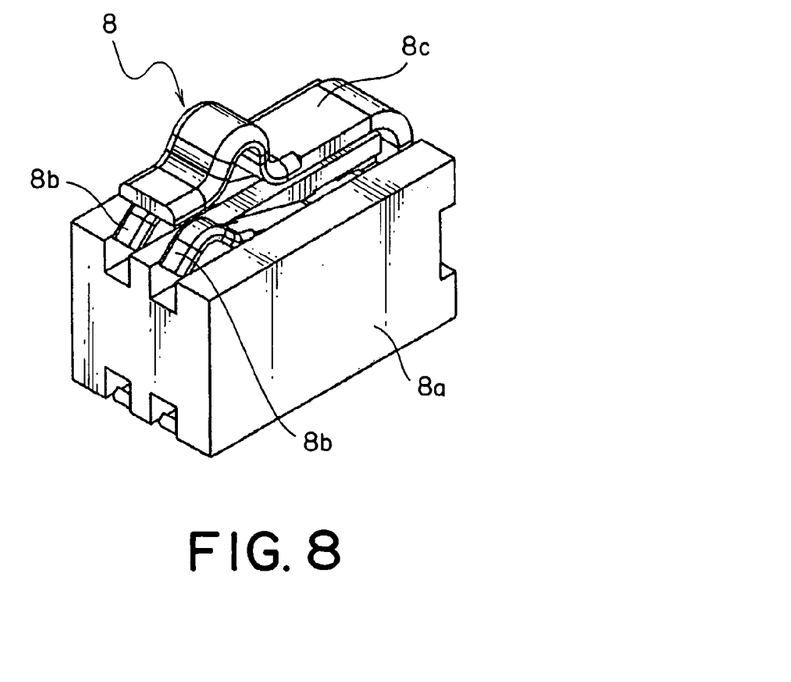
FIG. 8 is a perspective view of a switch illustrated in FIGS. 4A and 6.
Figure 9:
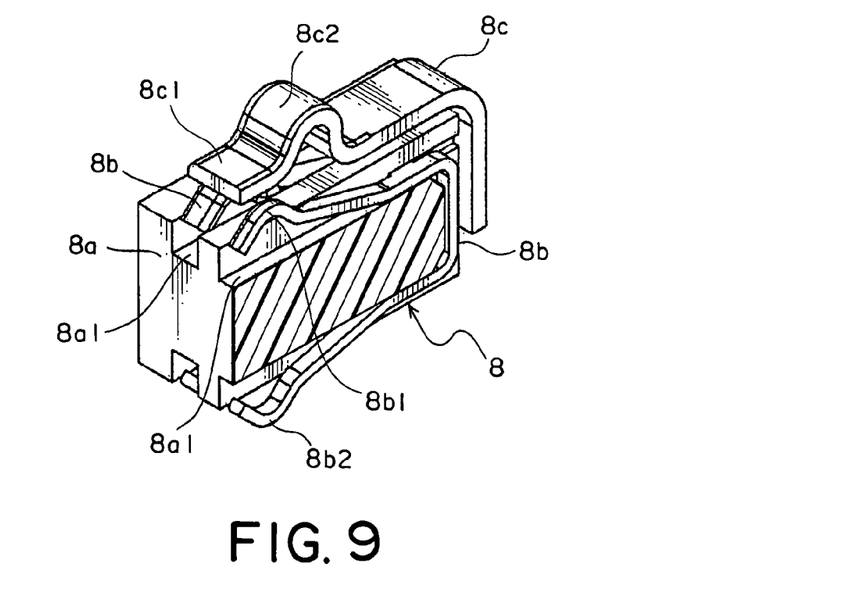
FIG. 9 is a perspective sectional view of the switch illustrated in FIG. 8.
Figure 10:
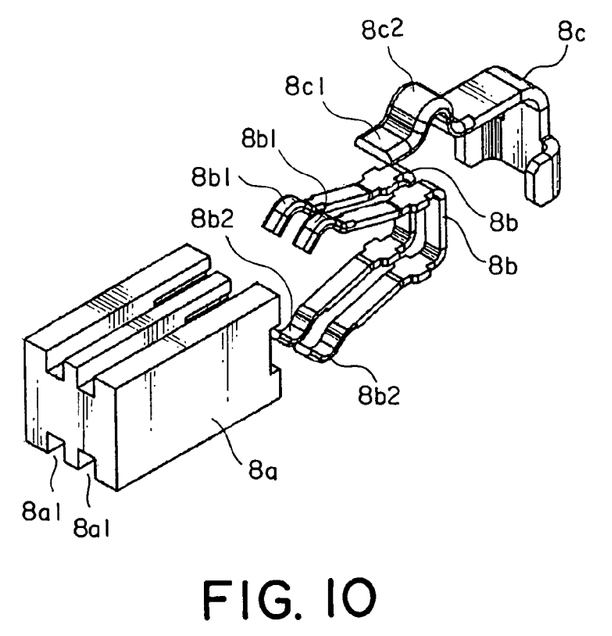
FIG. 10 is an exploded perspective view of the switch illustrated in FIG. 8.

Referring to FIG. 2, the electronic apparatus is in a special state where the camera 3 is rotated by 180° from the state in FIG. 1 and retreated. In the special state, the photographer can take a photograph of himself. It is assumed here that, in the special state, the protruding portion 8c2 of the switch 8 is faced to the escape portion 9c of the cam member 9. Therefore, pushing force upon the protruding portion 8c2 is released so that the switch 8 is turned into an OFF state.

As mentioned above, the switch 8 is turned on and off in response to rotation of the second housing 2 with respect to the first housing 1, i.e., in response to change in position of the camera 3. Therefore, if the switch 8 is in an ON state, it is possible to obtain a switch signal for inverting a camera image upside down as compared with that when the switch 8 is in an OFF state.

In the above-mentioned electronic apparatus, switching of the switch 8 responsive to the relative rotation between the first and the second housings 1 and 2 is controlled by a simple cam mechanism. Therefore, the electronic apparatus is not complicated in structure. Further, the switch signal may be used for turning on and off a power supply of the camera.

Figure 11:
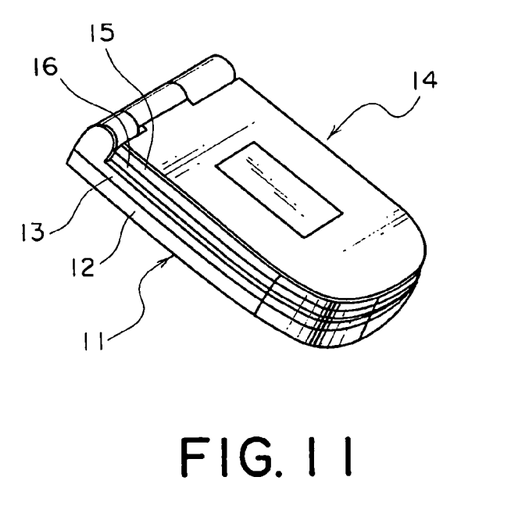
FIG. 11 is a perspective view of a foldable mobile telephone having a hinge apparatus according to a second embodiment of the present invention in a closed state.
Figure 12:
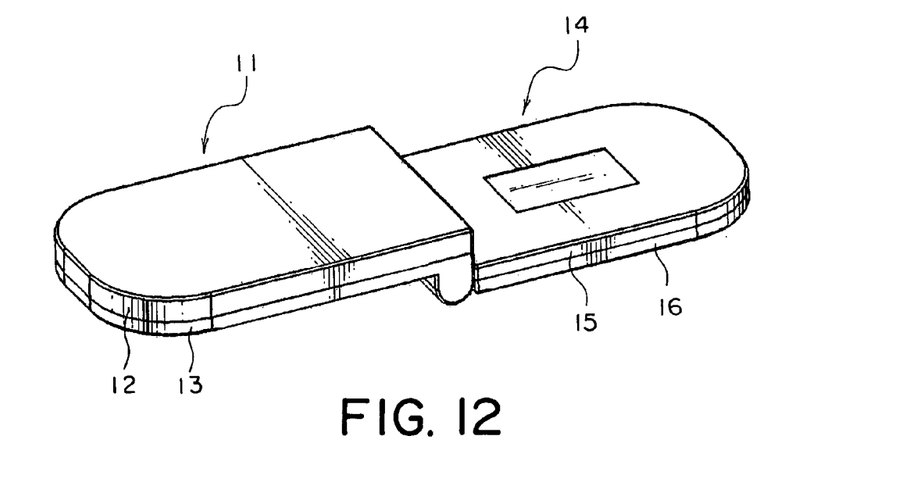
FIG. 12 is a perspective view of the foldable mobile telephone in FIG. 11 in an opened state.
Figure 13:
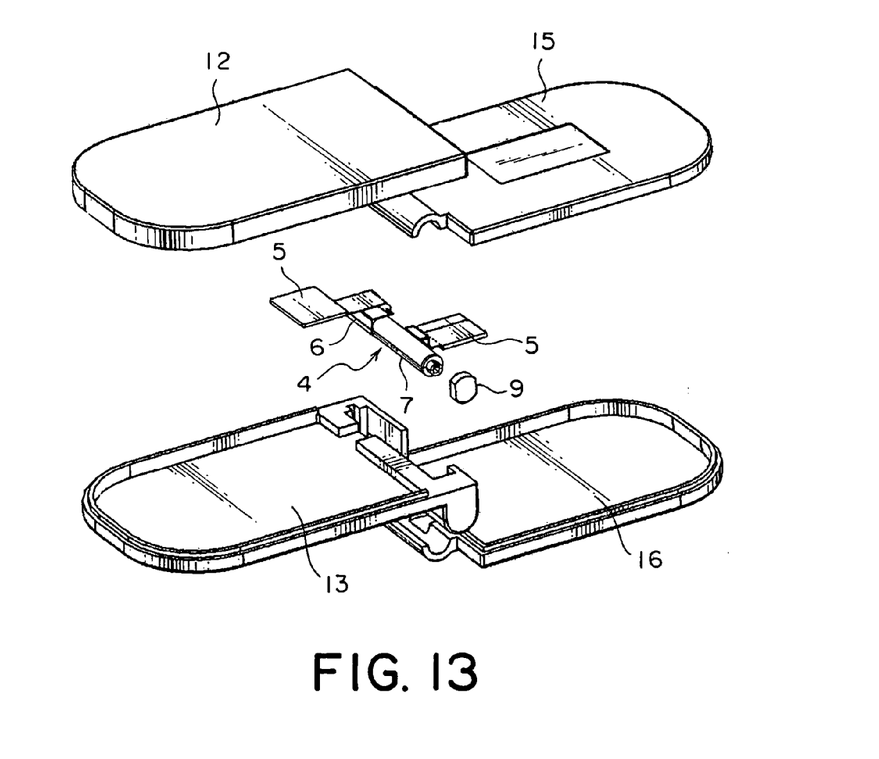
FIG. 13 is an exploded perspective view of the foldable mobile telephone in FIGS. 11 and 12.

Next referring to FIGS. 11 through 13, description will be made of a foldable mobile telephone having a hinge apparatus according to a second embodiment of the present invention.

The foldable mobile telephone illustrated in the figures comprises an operating part 11 having a first housing including a pair of cases 12 and 13, and a display part 14 having a second housing including a pair of cases 15 and 16. The operating part 11 is provided with an operating portion. The display part 14 is provided with a display surface. The hinge apparatus 4 connects the operating part 11 and the display part 14 so that the operating part 11 and the display part 14 are foldable, i.e., openable and closable. The first and the second rotating portions 6 and 7 of the hinge apparatus 4 are connected to flexible boards 5, respectively. The first rotating portion 6 is engaged with the first housing of the operating part 11 in the rotating direction. The second rotating portion 7 is engaged with the second housing of the display part 14 in the rotating direction.

Figure 14:
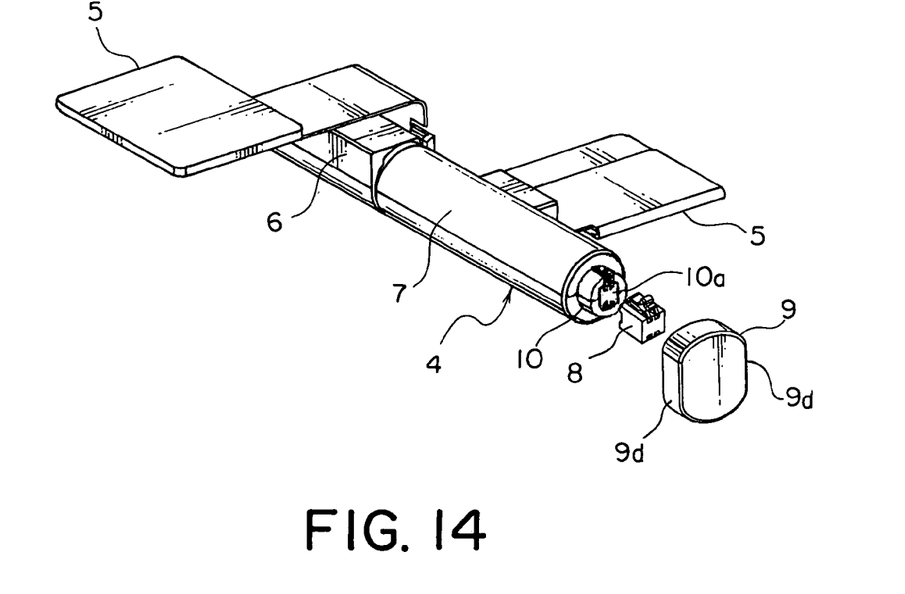
FIG. 14 is a perspective view of a characteristic part, including the hinge apparatus, of the foldable mobile telephone in FIGS. 11 through 13 in an exploded state.
Figure 15:
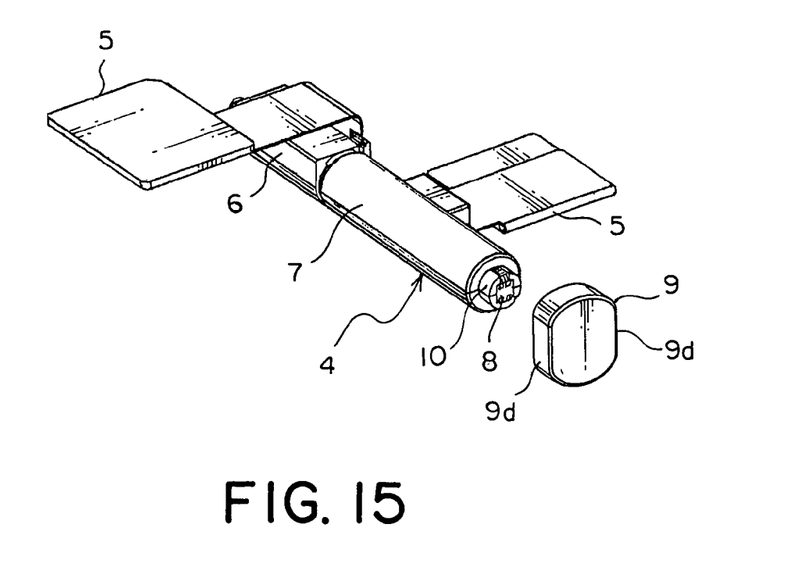
FIG. 15 is a perspective view of the characteristic part, including the hinge apparatus, of the foldable mobile telephone in FIGS. 11 through 13 during assembling.
Figure 16:
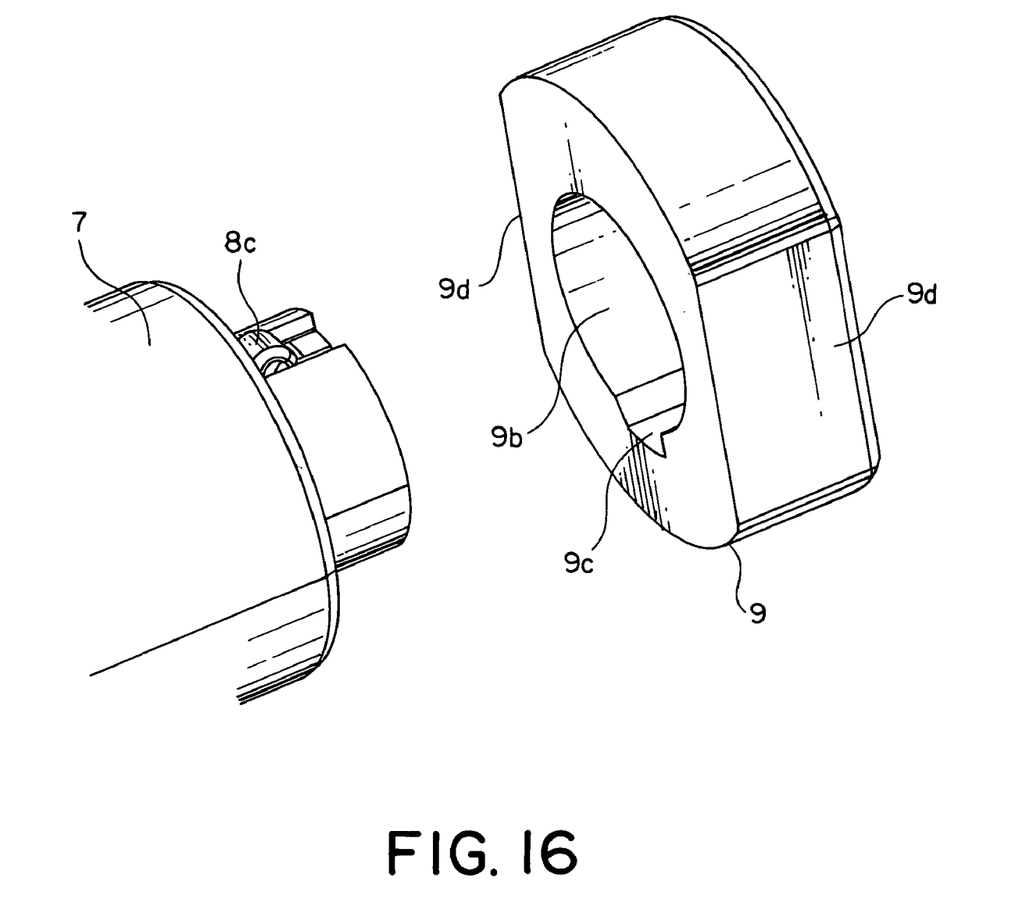
FIG. 16 is an enlarged perspective view of a part of FIG. 15 as seen in a different direction.

Referring to FIGS. 14 through 16, the hinge apparatus 4 will be described. Parts similar to those in the first embodiment are designated by like reference numerals and will not be described any longer.

The switching ring or cam member 9 has two flat surfaces 9*d* formed on the outer peripheral surface thereof and faced to each other. The flat surfaces 9*d* serve to be engaged with the first housing of the operating part 11 in the rotating direction.

Figure 17:
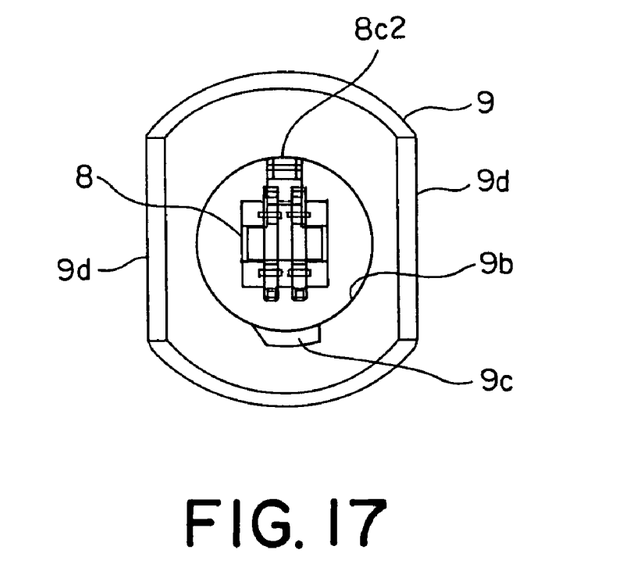
Figure 18:
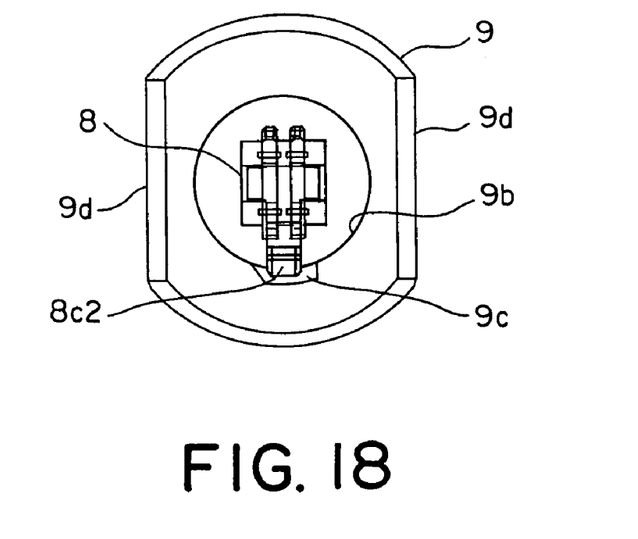
FIG. 18 is a side view showing an OFF state where the switch turns off.

When the protruding portion 8*c*2 of the switch 8 is faced to the cylindrical surface 9*b* of the cam member 9 as illustrated in FIG. 17, the switch 8 is in an ON state. When the display part 14 is opened and the switch 8 is rotated as illustrated in FIG. 18 following the rotation of the second rotating portion 7, the protruding portion 8*c*2 of the switch 8 is faced to the escape portion 9*c* of the cam member 9. As a result, the switch 8 is turned into an OFF state.

While this invention has thus far been described in conjunction with the preferred embodiments thereof, it will be readily possible for those skilled in the art to put this invention into practice in various other manners without departing from the scope of this invention. For example, the two embodiments have been described in the foregoing. However, the electronic apparatus may be modified in design in various manners. For example, the two conductor portions of the flexible board may be replaced by one conductor portion and the two first contacts may be replaced by one first contact. A closed circuit is formed by the second contact, the one conductor portion, and the one first contact.

What is claimed is:

1. A hinge apparatus for connecting a first housing and a second housing of an electronic apparatus so that the first and the second housings are rotatable with respect to each other, the hinge apparatus comprising:
   a first rotating portion adapted to be connected to the first housing;
   a second rotating portion adapted to be connected to the second housing and rotatable with respect to the first rotating portion;
   a switch unrotatably held by the second rotating portion; and
   a cam member disposed to face the switch, the cam member being rotatable with respect to the second rotating portion and adapted to be engaged with the second housing in a rotating direction of the hinge apparatus;
   wherein the switch includes a conductive first contact and a conductive second contact faced to the first contact and adapted to be connected to and disconnected from the first contact;
   wherein the cam member has a cam portion for pressing the second contact following rotation of the cam member to connect and disconnect the second contact to and from the first contact; and
   wherein the second rotating portion has a receiving portion, and the switch is removably received in the receiving portion.

2. The hinge apparatus according to claim 1, wherein the switch further includes an insulating base holding the first and the second contacts and engaged with the first rotating portion in the rotating direction.

3. The hinge apparatus according to claim 1, wherein the receiving portion has an exposed conductor portion, and the first contact is brought into contact with the conductor portion.

4. A hinge apparatus for connecting a first housing and a second housing of an electronic apparatus so that the first and the second housings are rotatable with respect to each other, the hinge apparatus comprising:
   a first rotating portion adapted to be connected to the first housing;
   a second rotating portion adapted to be connected to the second housing and rotatable with respect to the first rotating portion;
   a switch unrotatably held by the second rotating portion; and
   a cam member disposed to face the switch, the cam member being rotatable with respect to the second rotating portion and adapted to be engaged with the second housing in a rotating direction of the hinge apparatus;
   wherein the switch includes a conductive first contact and a conductive second contact faced to the first contact and adapted to be connected to and disconnected from the first contact;
   wherein the cam member has a cam portion for pressing the second contact following rotation of the cam member to connect and disconnect the second contact to and from the first contact; and
   wherein the second rotating portion has a cylindrical portion, and the cam member is rotatably fitted over the cylindrical portion.

5. The hinge apparatus according to claim 4, wherein the cylindrical portion has a receiving portion formed inside thereof, and the switch is received in the receiving portion.

6. The hinge apparatus according to claim 5, wherein the second contact has a protruding portion protruding from an outer peripheral surface of the cylindrical portion, the cam member has an inner peripheral surface faced to the outer peripheral surface of the cylindrical portion, the cam portion is formed on the inner peripheral surface, and the cam portion is engaged with the protruding portion following the rotation of the cam member.

7. The hinge apparatus according to claim 6, wherein the cylindrical portion has a cut portion, and the second contact protrudes from the outer peripheral surface of the cylindrical portion through the cut portion to form the protruding portion.

8. The hinge apparatus according to claim 6, wherein the inner peripheral surface of the cam member is provided with a cylindrical surface engaged with the protruding portion and an escape portion for escaping the protruding portion.

9. The hinge apparatus according to claim 4, wherein the cam member has an outer peripheral surface provided with an engaging protrusion to be engaged with the second housing in the rotating direction.

10. The hinge apparatus according to claim 4, wherein the cam member has an outer peripheral surface provided with a flat surface to be engaged with the second housing in the rotating direction.

11. An electronic apparatus comprising:
   a first housing;
   a second housing;
   a hinge apparatus connecting the first housing and the second housing so that the first housing and the second housing are rotatable with respect to each other;
   wherein the hinge apparatus comprises:
      a first rotating portion adapted to be connected to the first housing;
      a second rotating portion adapted to be connected to the second housing and rotatable with respect to the first rotating portion;
      a switch unrotatably held by the second rotating portion; and
      a cam member disposed to face the switch, the cam member being rotatable with respect to the second rotating portion and adapted to be engaged with the second housing in a rotating direction of the hinge apparatus;
   wherein the switch includes a conductive first contact and a conductive second contact faced to the first contact and adapted to be connected to and disconnected from the first contact;
   wherein the cam member has a cam portion for pressing the second contact following rotation of the cam member to connect and disconnect the second contact to and from the first contact; and
   wherein the second rotating portion has a receiving portion, and the switch is removably received in the receiving portion.

* * * * *